(12) United States Patent
Nakajima et al.

(10) Patent No.: US 6,863,982 B2
(45) Date of Patent: Mar. 8, 2005

(54) CURABLE FILM-FORMING COMPOSITION EXHIBITING IMPROVED YELLOWING RESISTANCE

(75) Inventors: Masayuki Nakajima, Wexford, PA (US); Charles M. Kania, Natrona Heights, PA (US); Stephen G. McQuown, Cheswick, PA (US); Karen S. Rechenberg, Gibsonia, PA (US); Susan A. Campbell, Pittsburgh, PA (US); Kurt A. Humbert, Pittsburgh, PA (US); Karen A. Barkac, North Huntingdon, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 41 days.

(21) Appl. No.: 10/269,389

(22) Filed: Oct. 11, 2002

(65) Prior Publication Data

US 2004/0071972 A1 Apr. 15, 2004

(51) Int. Cl.⁷ .............................................. B32B 27/38
(52) U.S. Cl. ...................... 428/413; 525/115; 525/131; 525/327.3; 525/340; 525/533; 525/398
(58) Field of Search .......................... 428/413; 525/115, 525/131, 327.3, 340, 533, 398; 528/89, 112, 103, 366

(56) References Cited

U.S. PATENT DOCUMENTS

| | | | |
|---|---|---|---|
| 3,262,903 A | 7/1966 | Robertson | |
| 3,578,616 A | 5/1971 | Harry et al. | 260/18 |
| 3,637,591 A | 1/1972 | Coran | 260/47 |
| 3,655,816 A | 4/1972 | Lorenz et al. | 260/830 |
| 4,482,700 A | 11/1984 | Kühnrich et al. | 528/279 |
| 5,096,980 A | 3/1992 | Yamazaki et al. | 525/438 |
| 5,331,080 A | 7/1994 | Swarup et al. | 528/89 |
| 5,376,453 A * | 12/1994 | von Gentzkow et al. | 428/415 |
| 5,939,195 A | 8/1999 | Allen et al. | 428/413 |
| 2003/0124379 A1 * | 7/2003 | Reising et al. | 428/626 |

FOREIGN PATENT DOCUMENTS

WO        WO 99/31186        6/1999

OTHER PUBLICATIONS

Abstract, GB 877136, Swift and Company, Jun. 1991.*
Abstract, GB 877136, Jun. 1961.*
Penczek et al., Models of Biopolymers with Backbones of Poly(alkylne Phosphates) Recent Progress in Synthesis and Applications, Centre of Molecular and Macromolecular Studies Polish Academy of Sciences 90–363 Lodz, Sienkiewicza 112, Poland.
Penczek et al., Gioanalogous Polymers with Poly (Alkylene Phosphate) Chains, Makromol. Chem. Macromol. Symp. 48/49, 1–13 (1991).
Klosinski et al., Addition Polymerization of $H_3PO_3$ to Diepoxides, Centre of Molecular and Macromolecular Studies, Polish Academy of Sciences, Boczna 5, 90–363 Lodz, Poland, (1987).

* cited by examiner

Primary Examiner—David J. Buttner
Assistant Examiner—Christopher Keehan
(74) Attorney, Agent, or Firm—Deborah M. Altman

(57) ABSTRACT

A curable film-forming composition of 5 to 95 weight percent (based on the total resin solids weight in the composition) of a crosslinking agent; 5 to 95 weight percent of a polymer containing functional groups reactive with the crosslinking agent; and 0.01 to 15 weight percent of at least one additive selected from a reaction product of phosporous acid and: at least one diepoxide; at least one diepoxide and at least one anhydride; at least one diepoxide and at least one anhydride, chain extended with at least one diol; at least one monoepoxide and at least one anhydride, chain extended with at least one diepoxide; and mixtures thereof. The additives in the composition prevent thermal oxidation, minimizing visual effects (i.e., yellowing). A multi-component composite coating includes a base coat and a top coat which may be derived from the above curable film-forming composition.

32 Claims, No Drawings

CURABLE FILM-FORMING COMPOSITION EXHIBITING IMPROVED YELLOWING RESISTANCE

FIELD OF THE INVENTION

The present invention relates to curable film-forming compositions containing additives effective against thermal oxidation.

BACKGROUND OF THE INVENTION

Color-plus-clear coating systems involving the application of a colored or pigmented base coat to a substrate, followed by the application of a transparent or clear topcoat to the base coat, have become conventional as original finishes for automobiles. The color-plus-clear systems have outstanding gloss and distinctness of image, and the clear coat is particularly important for these properties.

In recent years, high solids liquid coatings and powder coatings have become increasingly popular because these coatings are inherently low in volatile organic content (VOC), which significantly reduces air emissions during the application process. Epoxy condensation polymers, vinyl chloride polymers, and acrylic resins have been used as the main film-forming polymers for these coatings. The advantage of the acrylic resin system over the epoxy condensation polymers and vinyl chloride polymers is that acrylic resins provide superior outdoor durability, are more resistant to heat, and have better solvent and chemical resistance. Glycidyl functional acrylic resins provide such desired properties.

Additional requirements in the automotive coatings market include good exterior durability, particularly upon exposure to extreme conditions, acid etch and water spot resistance, and excellent gloss and appearance. Currently, these properties can be achieved using epoxy-acid cured coatings.

Although epoxy-acid systems are known for powder coatings, they are presently not widely used commercially for automotive OEM clear coatings in color-plus-clear composite systems because such coatings can exhibit inferior appearance properties, such as yellowing, poor flow, and poor cured film properties. Yellowing is often due to the thermal oxidation of amine functional catalysts present in the coatings for curing purposes. Yellowing may also be caused by overbake conditions and interactions with underlayers.

It would be desirable to provide curable film-forming compositions and color-plus-clear composite coating compositions that overcome the drawbacks of the prior art by exhibiting reduced yellowing, while maintaining other properties such as humidity resistance, acid etch and water spot resistance, and exterior durability.

SUMMARY OF THE INVENTION

In accordance with the present invention, a curable film-forming composition is provided comprising (i) 5 to 95 percent by weight based on the total weight of the film-forming composition of a crosslinking agent; (ii) 5 to 95 percent by weight based on the total weight of the film-forming composition of a polymer containing a plurality of functional groups reactive with the crosslinking agent; and (iii) 0.01 to 15 percent by weight based on the total weight of resin solids in the film-forming composition of at least one additive selected from the group consisting of:
 (a) a reaction product of phosphorous acid and at least one diepoxide;
 (b) a reaction product of phosphorous acid, at least one diepoxide, and at least one anhydride;
 (c) a reaction product of phosphorous acid, at least one diepoxide, and at least one anhydride, chain extended with at least one diol;
 (d) a reaction product of phosphorous acid, at least one monoepoxide, and at least one anhydride, chain extended with at least one diepoxide; and
 (e) mixtures thereof.

A multi-component composite coating is also provided. The composite coating composition comprises a film-forming composition serving as a base coat and a clear film-forming composition serving as a transparent topcoat over the base coat. The transparent topcoat, or clear coat, is derived from the curable powder film-forming composition described above. The compositions of the present invention exhibit minimal thermal oxidation during and after curing. Visual effects of thermal oxidation, such as yellowing, are minimized particularly when compared to compositions that do not contain the additive.

DETAILED DESCRIPTION

Other than in any operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10; that is, having a minimum value equal to or greater than 1 and a maximum value of equal to or less than 10.

The crosslinking agent (i) can be present in the curable film-forming composition of the present invention in an amount ranging from at least 5 percent by weight, typically at least 20 percent by weight, based-on the total weight of resin solids in the curable film-forming composition. The crosslinking agent (i) also can be present in the curable film-forming composition of the present invention in an amount less than 95 percent by weight, typically less than 80 percent by weight, based on the total weight of resin solids in the film-forming composition. The amount of the crosslinking agent (i) present in the film-forming composition of the present invention is dependent on the type of crosslinking agent used, and can range between any combination of the above values inclusive of the recited values. Examples of suitable crosslinking agents include any known crosslinking agents useful in curable film-forming compositions.

Epoxide reactive crosslinking agents that are useful in the film-forming compositions of the present invention may have functional groups selected from hydroxyl, thiol, primary amines, secondary amines, carboxyl, and mixtures thereof. Useful epoxide reactive crosslinking agents having amine functionality include, for example, dicyandiamide and substituted dicyandiamides. In one embodiment of the present invention, the epoxide reactive crosslinking agent has carboxylic acid functionality and is substantially crystalline. By "crystalline" is meant that the crosslinking agent contains at least some crystalline domains, and correspondingly may contain some amorphous domains. When the curable film-forming composition is in a solid particulate form, i. e., powder, the epoxide reactive crosslinking agent often has a melt viscosity less than that of the epoxy functional polymer (at the same temperature). As used herein, by "epoxide reactive crosslinking agent"0 is meant that the epoxide reactive crosslinking agent has at least two functional groups that are reactive with epoxide functionality.

Most often, the epoxide reactive crosslinking agent is a carboxylic acid functional crosslinking agent, which typically contains from 4 to 20 carbon atoms. Examples of carboxylic acid functional crosslinking agents useful in the present invention include, but are not limited to, dodecanedioic acid, azelaic acid, adipic acid, 1,6-hexanedioic acid, succinic acid, pimelic acid, sebacic acid, maleic acid, citric acid, itaconic acid, aconitic acid, and mixtures thereof.

Other suitable carboxylic acid functional crosslinking agents include those represented by the following general formula I:

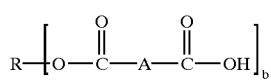

In general formula I, R is the residue of a polyol, A is a divalent linking group having from 1 to 10 carbon atoms, and b is an integer of from 2 to 10. Examples of polyols from which R of general formula I may be derived include, but are not limited to, ethylene glycol, di(ethylene glycol), trimethylolethane, trimethylolpropane, pentaerythritol, di-trimethylolpropane, di-pentaerythritol, and mixtures thereof. Divalent linking groups from which A may be selected include, but are not limited to, methylene, ethylene, propylene, isopropylene, butylene, pentylene, hexylene, heptylene, octylene, nonylene, decylene, cyclohexylene, e.g., 1,2-cyclohexylene, substituted cyclohexylene, e.g., 4-methyl-1,2-cyclohexylene, phenylene, e.g., 1,2-phenylene, and substituted phenylene, e.g., 4-methyl-1,2-phenylene and 4-carboxylic acid-1,2-phenylene. The divalent linking group A is preferably aliphatic.

The crosslinking agent represented by general formula I is typically prepared from a polyol and a dibasic acid or cyclic anhydride. For example, trimethylol propane and hexahydro-4-methylphthalic anhydride are reacted together in a molar ratio of 1:3, respectively, to form a carboxylic acid functional crosslinking agent. This particular crosslinking agent can be described with reference to general formula I as follows: R is the residue of trimethylol propane, A is the divalent linking group 4-methyl-1,2-cyclohexylene, and b is 3. Carboxylic acid functional crosslinking agents described herein with reference to general formula I are meant to also include any unreacted starting materials and/or co-products, e.g., oligomeric species, resulting from their preparation and contained therein.

One or more beta-hydroxyalkylamide crosslinking agents (i) may be present in curable coating compositions comprising carboxylic acid functional polymer as component (ii). The beta-hydroxyalkylamide crosslinking agent can be represented by the following general formula II:

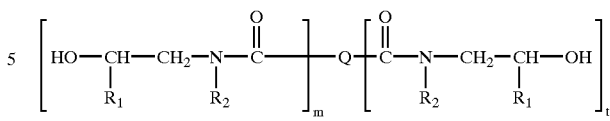

wherein $R_1$ is H or $C_1$–$C_5$ alkyl; $R_2$ is H, $C_1$–$C_5$ alkyl or

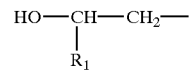

wherein $R_1$ is as described above, Q is a chemical bond or monovalent or polyvalent organic radical derived from saturated, unsaturated, or aromatic hydrocarbon radicals including substituted hydrocarbon radicals containing from 2 to 20 carbon atoms, m equals 1 or 2, t equals 0 to 2, and m+t is at least 2. Preferably, Q is an alkylene radical —$(CH_2)_x$— where x is equal to 2 to 12, preferably 4 to 10; m is equal to 1 to 2, t is equal to 0 to 2, and m+t is at least 2, preferably greater than 2, usually within the range from greater than 2 up to and including 4. The beta-hydroxyalkylamide crosslinking agent represented by general formula II can be prepared by art recognized methods, as described in, for example, U.S. Pat. No. 4,937,288 at column 7, lines 6 through 16.

Capped polyisocyanate crosslinking agents are also suitable for use as the crosslinking agent (i) in the curable film-forming composition of the present invention. By "capped polyisocyanate crosslinking agent" is meant at least one crosslinking agent having two or more capped isocyanate groups that can decap (or deblock) under cure conditions, e.g., at elevated temperature, to form free isocyanate groups and free capping groups. The free isocyanate groups formed by decapping of the crosslinking agent are preferably capable of reacting and forming substantially permanent covalent bonds with the hydroxy groups of a hydroxy functional polymer.

It is desirable that the capping group of the capped polyisocyanate crosslinking agent does not adversely affect the curable film-forming composition upon decapping from the isocyanate group, i.e., when it becomes a free capping group. For example, it is desirable that the free capping group neither become trapped in the cured film as gas bubbles nor excessively plasticize the cured film. Capping groups useful in the present invention preferably have the characteristics of being fugitive or capable of escaping substantially from the forming coating prior to its vitrification.

Suitable capping agents may be selected from: hydroxy functional compounds, e.g., ethylene glycol butyl ether, phenol and p-hydroxy methylbenzoate; 1H-azoles, e.g., 1H-1,2,4-triazole and 1H-2,5-dimethyl pyrazole; lactams, e.g., ε-caprolactam and 2-pyrolidinone; ketoximes, e.g., 2-propanone oxime and 2-butanone oxime and those ketoximes described in U.S. Pat. No. 5,508,337 at column 7, lines 11 through 22, the disclosure of which is incorporated herein by reference. Other suitable capping groups include morpholine, 3-aminopropyl morpholine, and N-hydroxy phthalimide.

The capped polyisocyanate crosslinking agent has two or more isocyanate groups and is typically solid at room temperature when used in powder film-forming compositions. Examples of suitable polyisocyanates that may be used to prepare the capped polyisocyanate crosslinking agent include but are not limited to monomeric diisocyanates, e.g., α,α'-xylylene diisocyanate, α,α,α',α'- tetramethylxylylene diisocyanate, and 1-isocyanato-3-isocyanatomethyl-3,5,5-trimethylcyclohexame (isophorone diisocyanate or IPDI), and dimers and trimers of monomeric diisocyanates containing isocyanurate, uretidino, biuret or allophanate linkages, e.g., the trimer of IPDI. Isocyanates that are useful in the present invention are described in further detail in U.S. Pat. No. 5,777,061 at column 3, line 4 to column 4, line 40, the disclosure of which is incorporated herein by reference. A particularly suitable polyisocyanate is a trimer of 1-isocyanato-3,3,5-trimethyl-5-isocyanatomethylcyclohexane.

The capped polyisocyanate crosslinking agent may also be selected from oligomeric capped polyisocyanate functional adducts. As used herein, by "oligomeric capped polyisocyanate functional adduct" is meant a material that is substantially free of polymeric chain extension. Oligomeric capped polyisocyanate functional adducts can be prepared by art-recognized methods from, for example, a compound containing three or more active hydrogen groups, e.g., trimethylolpropane (TMP), and an isocyanate monomer, e.g., 1-isocyanato-3,3,5-trimethyl-5-isocyanantomethylcyclohexane (IPDI), in a molar ratio of 1:3, respectively. In the case of TMP and IPDI, by employing art-recognized starved feed and/or dilute solution synthesis techniques, an oligomeric adduct having an average isocyanate functionality of 3 can be prepared ("TMP-3IPDI"). The three free isocyanate groups per TMP-3IPDI adduct are then capped with a capping group, e.g., 2-propanone oxime or ε-caprolactam.

The functional group-containing polymer (ii) typically is present in the curable film-forming composition of the present invention in an amount ranging from at least 5 percent by weight, preferably at least 20 percent by weight, based on the total weight of resin solids in the curable film-forming composition. The functional group-containing polymer (ii) also typically is present in the curable film-forming composition of the present invention in an amount less than 95 percent by weight, preferably less than 80 percent by weight, based on the total weight of resin solids in the curable coating composition. The amount of the functional group-containing polymer (ii) present in the film-forming composition of the present invention is dependent on the type of polymer used and can range between any combination of these values inclusive of the recited values.

Classes of epoxide functional polymers from which the functional group-containing polymer (ii) in the curable coating compositions of the present invention may be selected include, but are not limited to, epoxide functional vinyl polymers, e.g., epoxide functional (meth)acrylic polymers, epoxide functional polyethers, epoxide functional polyesters, and combinations thereof. Epoxide functional vinyl polymers can be prepared by free radical polymerization methods that are known to those of ordinary skill in the art. Such known free radical polymerization methods typically make use of suitable initiators, which include organic peroxides and azo-type compounds and chain transfer agents, such as alpha-methyl styrene dimer and tertiary dodecyl mercaptan.

Epoxide functional vinyl polymers are typically prepared by polymerizing one or more epoxide functional ethylenically unsaturated monomers, e.g., glycidyl methacrylate, with one or more ethylenically unsaturated monomers that are free of epoxide functionality, e.g., methyl (meth)acrylate, isobornyl (meth)acrylate, butyl (meth)acrylate, and styrene. Examples of epoxide functional ethylenically unsaturated monomers that may be used in the preparation of epoxide functional vinyl polymers include, but are not limited to, glycidyl (meth)acrylate, 3,4-epoxycyclohexylmethyl (meth)acrylate, 2-(3,4-epoxycyclohexyl)ethyl (meth)acrylate, and allyl glycidyl ether. Examples of ethylenically unsaturated monomers that are free of epoxide functionality include those described in U.S. Pat. No. 5,407,707 at column 2, lines 17 through 56.

In a particular embodiment of the present invention, the epoxide functional vinyl polymer is prepared from a majority of (meth)acrylate monomers and is referred to herein as an "epoxide functional (meth)acrylic polymer." The epoxide functional vinyl polymer typically has a number average molecular weight of from 500 to 5000, e.g., from 800 to 2500.

Epoxide functional polyethers can be prepared from a hydroxy functional monomer, e.g., a diol, and an epoxide functional monomer, and/or a monomer having both hydroxy and epoxide functionality. Suitable epoxide functional polyethers include, but are not limited to, those based on 4,4'-isopropylidenediphenol (Bisphenol A), a specific example of which is EPON® RESIN 2002 available commercially from Resolution Performance Products.

Epoxide functional polyesters can be prepared by art-recognized methods, which typically include first preparing a hydroxy functional polyester that is then reacted with epichlorohydrin. Polyesters having hydroxy functionality may be prepared by art-recognized methods, which include reacting carboxylic acids (and/or esters thereof) having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester-has hydroxy functionality and the desired molecular weight.

Examples of multifunctional carboxylic acids useful in preparing hydroxy functional polyesters are known to the skilled artisan and include, for example, phthalic acid, tetrahydrophthalic acid, hexahydrophthalic acid, isophthalic acid, and terephthalic acid. Examples of polyols useful in preparing hydroxy functional polyesters are known to those skilled in the art and include, for example, glycerin, trimethylolpropane, ethylene glycol, and 1,4-dimethylolcyclohexane.

Curable coating compositions comprising an epoxide functional polymer and an epoxide reactive crosslinking agent usually also include one or more cure catalysts for catalyzing the reaction between the reactive functional groups of the crosslinking agent and the epoxide groups of the polymer. Examples of cure catalysts for use with acid functional crosslinking agents include tertiary amines, e.g., methyl dicocoamine, and tin compounds, e.g., triphenyl tin hydroxide. Curing catalyst is typically present in the curable coating composition in an amount of less than 5 percent by weight, e.g., from 0.25 percent by weight to 2.0 percent by weight, based on the total resin solids weight of the composition.

Curable coating compositions comprising an epoxide functional polymer and an epoxide reactive crosslinking agent typically have present therein epoxide functional polymer in an amount of from 60 percent to 95 percent by weight, based on the total resin solids weight of the composition, e.g., from 70 percent to 85 percent by weight, based on the total resin solids weight of the composition. The epoxide reactive crosslinking agent is typically present in the curable coating composition in an amount corresponding to the balance of these recited ranges (i.e., 5 to 40, and particularly 15 to 30 percent by weight). The equivalent ratio of epoxide equivalents in the epoxide functional polymer to the equivalents of reactive functional groups in the crosslinking agent is typically from 0.5:1 to 2:1, e.g., from 0.8:1 to 1.5:1. Curable coating compositions comprising an epoxide functional polymer and a carboxylic acid functional crosslinking agent are typically cured at a temperature of from 120° C. to 180° C. over a period of from 10 to 60 minutes.

Carboxylic acid-functional vinyl polymers useful with beta-hydroxyalkylamide functional crosslinking agents can be prepared by free radical polymerization methods that are known to those of ordinary skill in the art, for example, free radical polymerization methods as described previously herein. The carboxylic acid functional vinyl polymer is typically prepared by polymerizing one or more carboxylic acid functional ethylenically unsaturated monomers, e.g., (meth)acrylic acid, with one or more ethylenically unsaturated monomers that are free of carboxylic acid functionality, e.g., methyl (meth)acrylate, isobornyl (meth)acrylate, butyl (meth)acrylate and styrene. Alternatively, the carboxylic acid functional vinyl polymer may be prepared by first preparing a hydroxy functional vinyl polymer that is then reacted with a cyclic anhydride, e.g., succinic anhydride. Carboxylic acid functional vinyl, e.g., (meth)acrylic, polymers useful in the present invention are described in further detail in U.S. Pat. No. 4,937,288, column 2, line 1 to column 4, line 17.

Polyesters having carboxylic acid functionality may be prepared by art-recognized methods, which include reacting carboxylic acids (and/or esters thereof) having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has carboxylic acid functionality and the desired molecular weight. Carboxylic acid functional polyesters useful in the present invention are described in, for example, U.S. Pat. No. 4,937,288, column 4, line 18 to column 6, line 12.

Carboxylic acid functional polyurethanes may be prepared by reacting polyols and polyisocyanates so as to form a polyurethane polyol, which is then reacted with polycarboxylic acid or cyclic anhydride to introduce free carboxylic acid groups into the reaction product. Carboxylic acid functional polyurethanes that may be used in curable coating compositions comprising a beta-hydroxyalkylamide crosslinking agent are described in further detail in U.S. Pat. No. 4,937,288, at column 6, lines 13 through 39.

Curable coating compositions comprising a carboxylic acid functional polymer and a-beta-hydroxyalkylamide crosslinking agent typically have present therein carboxylic acid functional polymer in an amount of from 60 percent to 95 percent by weight, based on the total resin solids weight of the composition, e.g., from 80 percent to 90 percent by weight, based on the total resin solids weight of the composition. The beta-hydroxyakylamide crosslinking agent is typically present in the curable coating composition in an amount corresponding to the balance of these recited ranges (i.e., 5 to 40, and particularly 10 to 20 percent by weight).

To achieve a suitable level of cure, the ratio of hydroxy equivalents in the beta-hydroxyalkylamide crosslinking agent to carboxylic acid equivalents in the carboxylic acid functional polymer is preferably from 0.6:1 to 1.6:1, and more preferably from 0.8:1 to 1.3;1. Curable coating compositions comprising a carboxylic acid functional polymer and beta-hydroxyalkylamide functional crosslinking agent are typically cured at a temperature of from 145° C. to 210° C. over a period of from 10 to 60 minutes, using suitable amine or tin catalysts as known to those skilled in the art.

Hydroxy functional polymers that can be used as component (ii) in combination with capped polyisocyanate functional crosslinking agents include, but are not limited to, hydroxy functional vinyl polymers, hydroxy functional polyesters, hydroxy functional polyurethanes, and mixtures thereof.

Vinyl polymers having hydroxy functionality can be prepared by free radical polymerization methods that are known to those of ordinary skill in the art, for example as described in U.S. Pat. No. 5,508,337, column 3, line 15 to column 5, line 23. In an embodiment of the present invention, the hydroxy functional vinyl polymer is prepared from a majority of (meth)acrylate monomers and is referred to herein as a "hydroxy functional (meth)acrylic polymer."

Hydroxy functional polyesters useful in curable coating compositions comprising a capped isocyanate functional crosslinking agent can be prepared by art-recognized methods. Typically, diols and dicarboxylic acids or diesters of dicarboxylic acids are reacted in a proportion such that the molar equivalents of hydroxy groups is greater than that of carboxylic acid groups (or esters of carbornyl acid groups) with the concurrent removal of water or alcohols from the reaction medium. Hydroxy functional polyesters useful in the present invention are described in further detail in U.S. Pat. No. 5,508,337 at column 5, line 24 to column 6, line 30.

Hydroxy functional urethanes can be prepared by art-recognized methods, for example, as previously described herein using excess amounts of polyol. Hydroxy functional urethanes useful in the present invention are described in further detail in U.S. Pat. No. 5,510,444, at column 5, line 33 to column 7, line 61.

To catalyze the reaction between the isocyanate groups of the capped polyisocyanate crosslinking agent and the hydroxy groups of the hydroxy functional polymer, one or more catalysts are typically present in the coating composition in amounts of from, for example, 0.1 to 5 percent by weight, based on total resin solids of the composition. Classes of useful catalysts include, metal compounds, in particular, organic tin compounds, e.g., tin(II) octanoate and dibutyltin(IV) dilaurate, and tertiary amines, e.g., diazabicyclo[2.2.2]octane. Examples of organic tin compounds and tertiary amines are described in U.S. Pat. No. 5,508,337 at column 7, lines 28 through 49, the disclosure of which is incorporated herein by reference.

Curable coating compositions comprising a hydroxy functional polymer and a capped isocyanate functional crosslinking agent, typically have present therein a hydroxy functional polymer in an amount of from 55 percent to 95 percent by weight, based on total resin solids weight of the composition, e.g., from 75 percent to 90 percent by weight, based on total resin solids weight of the composition. The capped isocyanate functional crosslinking agent is typically present in the film-forming composition in an amount corresponding to the balance of these recited ranges (i.e., 5 to 45, and particularly 10 to 25 percent by weight).

The ratio of isocyanate equivalents in the capped isocyanate crosslinking agent to hydroxy equivalents in the hydroxy functional polymer is typically within the range of 1:3 to 3:1, e.g., 1:2 to 2:1. While equivalent ratios outside of this range can be employed, they are generally less desirable due to performance deficiencies in cured films obtained therefrom. Coating compositions comprising a hydroxy functional polymer and a capped isocyanate functional crosslinking agent are typically cured at a temperature of from 120° C. to 190° C. over a period of from 10 to 60 minutes.

The curable film-forming composition of the present invention further comprises (iii) 0.01 to 15 percent by weight, preferably 0.5 to 5 percent by weight, based on the total weight of resin solids in the film-forming composition of at least one additive selected from the group consisting of:

(a) a reaction product of a phosphorous acid and at least one diepoxide;

(b) a reaction product of a phosphorous acid, at least one diepoxide, and at least one anhydride;

(c) a reaction product of a phosphorous acid, at least one diepoxide, and at least one anhydride, chain extended with at least one diol;

(d) a reaction product of a phosphorous acid, at least one monoepoxide, and at least one anhydride, chain extended with at least one diepoxide: and (e) mixtures thereof.

Examples of diepoxides suitable for use in the preparation of the additives used in the curable film-forming compositions of the present invention include saturated or unsaturated, cyclic or acyclic, aliphatic, alicyclic, aromatic, or heterocyclic diepoxides. They may contain substituents such as halogen, hydroxyl, and ether groups. The diepoxides are most often aliphatic.

Examples of specific diepoxides are diglycidyl ethers of cyclic polyols. These can be produced by etherification of diols with an epihalohydrin or dihalohydrin, such as epichlorohydrin or dichlorohydrin, in the presence of alkali. Examples of cyclic polyols include polyhydric phenols, alicyclic polyols, particularly cycloaliphatic polyols such as 2,2-bis(4-hydroxycyclohexyl) propane (hydrogenated Bisphenol A), 1,2-cyclohexane diol, and 1,2-bis(hydroxymethyl)cyclohexane.

The diepoxide used to prepare the additive (iii) may be a chain-extended diepoxide. Examples of polyhydroxyl group-containing materials used to chain extend or increase the molecular weight of the diepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as hydrogenated Bisphenol A, 1,2-hexanediol, 1,2-bis(hydroxymethyl)cyclohexane, ethylene glycol, glycerin, hexanediol, and neopentyl glycol; polyester polyols such as those described in U.S. Pat. No. 4,148,772, incorporated herein by reference; polyether polyols such as those described in U.S. Pat. No. 4,468,307, incorporated herein by reference; and urethane diols such as those described in U.S. Pat. No. 4,931,157, incorporated herein by reference. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used.

Diepoxides used most often in the preparation of the additive used in the film-forming compositions of the present invention include Eponex 1510 and Eponex 1511, available from Resolution Performance Products.

Anhydrides that may be used to prepare the additives in the curable film-forming compositions of the present invention are typically 1,2-dicarboxylic acid anhydrides. These anhydrides may contain from about 2 to 30 carbon atoms, exclusive of the carbon atoms in the anhydride functionality. Examples include aliphatic, cycloaliphatic, olefinic and cycloolefinic anhydrides. Substituted aliphatic anhydrides in which the substituents would not adversely affect the reactivity of the anhydride or the properties of the resulting reaction product can also be used. Examples of substituents include chloro- and alkoxy groups. Suitable anhydrides include succinic anhydride, methylsuccinic anhydride, dodecylsuccinic anhydride, octadecenylsuccinic anhydride, hexahydrophthalic anhydride, methylhexahydrophthalic anhydride, itaconic anhydride, citraconic anhydride, and nadic anhydride. Hexahydrophthalic anhydride is most often used.

Suitable diols for chain extension of the reaction product (c) include those polyols disclosed above. Preferred diols include hexanediol, diethylene glycol, polypropylene glycols, neopentyl glycol, and mixtures thereof. Monoepoxides used to prepare the reaction product of (d) include those disclosed in U.S. Pat. No. 5,331,080, at column 1, line 55 to column 2, line 17.

The additive (iii) may be prepared by mixing together the phosphorous acid and diepoxide in the presence of an organic solvent at a temperature of about 0 to 100° C. Temperatures above 100° C. are not recommended due to a tendency of the reaction mixture to gel. The progress of the reaction may be monitored by measuring the epoxy equivalent weight. The reaction is essentially complete when the epoxy equivalent weight is too high to measure. The molar ratio of phosphorous acid to diepoxide is typically 1.06:1.05 to 1.2:1.05.

When an anhydride is included as a reactant, it may be added initially and the reaction conducted in one step, or it may be added over time or post reacted with the reaction product of phosphorous acid and the diepoxide. Also, when an anhydride is included as a reactant, the molar ratio of phosphorous acid to diepoxide to anhydride is typically 0.1:1:0.01 to 1:2:>0.01. Those skilled in the art can manipulate the ratios.

When a diol is included as a chain extender, it may be added initially with the other reactants and the reaction conducted in one step, or it may be added over time or post reacted with the reaction product of phosphorous acid/diepoxide/anhydride. Also, when a diol is included, the molar ratio of phosphorous acid/diepoxide/anhydride reaction product to diol is typically 0.1:1:0.01 to 1:2:>0.01. Those skilled in the art can manipulate the ratios.

When the additive is reaction product (d), reaction of the phosphorous acid, monoepoxide, and anhydride may be conducted as described in U.S. Pat. No. 5,331,080 in column 2, line 33 to column 3, line 26. For chain extension with the diepoxide, the molar ratio of phosphorous acid/monoepoxide/anhydride reaction product to diepoxide is typically 2.0:1.0 to 1.0:2.0, more typically 1.0:0.8 to 1.0:1.2.

The number average molecular weight of the additive is typically in the range of 300 to 10000, as determined by gel permeation chromatography using a polystyrene standard.

Curable film-forming compositions of the present invention may optionally contain additives such as waxes to improve the slip properties of the cured coating, degassing-additives such as benzoin, adjuvant resin to modify and optimize coating properties, catalysts, antioxidants and ultraviolet (UV) light absorbers. Examples of useful antioxidants and UV light absorbers include those available commercially from Ciba-Geigy under the trademarks IRGANOX and TINUVIN. These optional additives, when used, are typically present in amounts up to 20 percent by weight, based on the total weight of resin solids in the curable composition.

Curable film-forming compositions of the present invention may be solventborne, waterborne, or in solid particulate (powder) forn. Organic solvent carriers include any of those known in the art. Waterborne formulations may be prepared by functionalizing the resins in the film-forming composition to allow for solubilization in water, or the resins may be emulsified or otherwise dispersed in an aqueous medium. Most often the compositions are powder.

Curable powder coating compositions useful in the present invention are typically prepared by first dry blending the functional polymer, e.g., epoxide functional polymer, the crosslinking agent, the particles and additives, such as degassing agents, flow control agents and catalysts, in a blender, e.g., a Henshel blade blender. The blender is operated for a period of time sufficient to result in a homogenous dry blend of the materials charged thereto. The homogeneous dry blend is then melt blended in an extruder, e.g., a twin screw co-rotating extruder, operated within a temperature range sufficient to melt but not gel the components. For example, when preparing curable powder coating compositions comprising an epoxide functional (meth)acrylic polymer and a carboxylic acid functional crosslinking agent, the extruder is typically operated within a temperature range of from 80° C. to 140° C., e.g., from 100° C. to 125° C.

Optionally, curable powder coating compositions of the present invention may be melt blended in two or more steps. For example, a first melt blend is prepared in the absence of a cure catalyst. A second melt blend is prepared at a lower temperature, from a dry blend of the first melt blend and the cure catalyst. The melt blended curable powder coating composition is typically milled to an average particle size of from, for example, 15 to 30 microns.

Alternatively, the powder coating compositions of the present invention can be prepared by blending and extruding the ingredients as described above, but without the particles. The particles can be added as a post-additive to the formulation by simply mixing the particles into the milled powder coating composition, such as by mixing using a Henschel mixer.

In an embodiment of the present invention, the curable powder coating composition is slurried in a liquid medium, such as water, which may be spray applied. Where the language "co-reactable solid, particulate mixture" is used in the specification and claims, the thermosetting composition can be in dry powder form or in the form of a slurry.

The compositions of the present invention can be applied to various substrates to which they adhere, including wood, metals, glass, and plastic. The compositions are most often applied by spraying. The usual spray techniques and equipment for air spraying and electrostatic spraying and either manual or automatic methods can be used.

The coating composition generally may be applied to a substrate by itself as a transparent or pigmented monocoat, or as the pigmented base coat and/or transparent topcoat in a color-plus-clear composite coating as known to those skilled in the art.

When the curable film-forming composition is used as part of a multi-component composite coating (that is, a multi-layer composite coating), for example, a color-plus-clear composite coating, a first film-forming composition, often a colored film-forming composition, is applied to a substrate as a base coat, and a film of the base coat is formed on the substrate. Typically, the base coat thickness can range from 0.01 to 5 mils (0.254 to 127 microns), preferably from 0.1 to 2 mils (2.54 to 50.8 microns) in thickness.

The film-forming composition of the base coat in the multi-layer system may be the composition of the present invention or any other compositions useful in coatings applications, particularly automotive applications. The film-forming composition of the base coat comprises a resinous binder and, if desired, a pigment to act as the colorant. Particularly useful resinous binders are acrylic polymers, polyesters, including alkyds, and polyurethanes.

The base coat compositions may be any powder, solvent-borne or waterborne composition known in the art. Waterborne base coats in color-plus-clear compositions are disclosed in U.S. Pat. No. 4,403,003, and the resinous compositions used in preparing these base coats can be used in the practice of this invention. Also, waterborne polyurethanes, such as those prepared in accordance with U.S. Pat. No. 4,147,679, can be used as the resinous binder in the base coat. Further, waterborne coatings, such as those described in U.S. Pat. No. 5,071,904, can be used as the base coat.

The base coat composition can contain pigments to give it color. Any of the pigments disclosed above for use in the curable film-forming composition of the present invention may be used, in similar amounts.

If desired, the base coat composition may contain additional materials well known in the art of formulated surface coatings. These would include surfactants, flow control agents, thixotropic agents, fillers, antigassing agents, organic cosolvents, catalysts, and other customary auxiliaries. These materials can constitute up to 40 percent by weight of the total weight of the coating composition.

After application of the base coat to the substrate, a film is formed on the surface of the substrate by driving any solvent, i. e., organic solvent or water, out of the base coat film by heating or by an air drying period. Suitable drying conditions will depend on the particular base coat composition and on the ambient humidity with certain waterborne compositions but, in general, a drying time of from about 1 to 5 minutes at a temperature of about 80° F.–250° F. (20° C.–121° C.) will be adequate to ensure that mixing of the two coats is minimized. More than one base coat and multiple topcoats may be applied to develop the optimum appearance. Usually between coats, the previously applied coat (if liquid) is flashed; that is, exposed to ambient conditions for about 0.5 to 10 minutes.

The topcoat composition, often a clear topcoat composition, is then applied to the base coat, typically by spray application. The thickness of the coating usually ranges from 0.5–5 mils (12.7 to 127 microns), preferably from 1.0–3 mils (25.4 to 76.2 microns).

The two coatings are then heated to cure both coating-layers simultaneously. In the curing operation, solvents are driven off, solid resin particles of powder compositions are melted, and the film-forming materials of the clear coat and the base coat are each crosslinked. The heating or curing operation is usually carried out at a temperature in the range of from 160° F.–350° F. (71° C.–177° C.) but, if needed, lower or higher temperatures may be used as necessary to activate crosslinking mechanisms. Note that when the coating composition of the present invention is used as a monocoat, the same curing conditions typically are suitable.

The compositions of the present invention exhibit reduced thermal oxidation during cure and after curing. Visual effects of thermal oxidation, such as yellowing, are noticeably reduced, particularly when compared to compositions that do not contain the additives used in the compositions of the present invention.

The present invention will further be described by reference to the following examples. The following examples are merely illustrative of specific embodiments of the invention and are not intended to limit the scope of the invention. Unless otherwise indicated, all parts are by weight.

SYNTHESIS EXAMPLE 1

A reaction product of phosphorous acid and a diepoxide was prepared from the following ingredients:

| INGREDIENTS | AMOUNTS |
| --- | --- |
| Charge I | |
| Phosphorous acid | 82.0 |
| Charge II | |
| MIBK | 100.0 |
| Charge III | |
| EPONEX 1510[1] | 445.2 |
| MIBK | 428.0 |

[1]polyepoxide commercially available from Resolution Performance Products.

Charge I was added to a suitable reactor and heated under agitation and vacuum to 80° C. to remove traces of water. Charge II was added and the mixture stirred to dissolve the phosphorous acid. Upon complete dissolution, the mixture was cooled. Charge III was added over 180 minutes and the temperature maintained between 25° C. and 35° C. with an ice water bath. After completion of Charge III, the reaction mixture was held at between 25° C. and 35° C. for 30 minutes. Epoxy equivalent weight was then measured to determine completion of the reaction. A vacuum was applied and MIBK distilled off at a temperature ranging from 80° C. to 120° C.

The finished product was 100 weight percent solids, with an acid number of 104.79, and a number average molecular weight of 298, determined by GPC using a THF standard.

SYNTHESIS EXAMPLE 2

A reaction product of phosphorous acid, a diepoxide, and an anhydride was prepared from the following ingredients:

| INGREDIENTS | AMOUNTS |
| --- | --- |
| Charge I | |
| Phosphorous acid | 82.1 |
| Charge II | |
| MIBK | 100.0 |
| Charge III | |
| EPONEX 1510 | 445.3 |
| Hexahydrophthalic Anhydride | 231.3 |
| MIBK | 658.5 |

Charge I was added to a suitable reactor and heated under agitation and vacuum to 60° C. to remove traces of water. Charge II was added and the mixture stirred to dissolve the phosphorous acid. Upon complete dissolution, the mixture was cooled. Charge III was added over 180 minutes and the temperature maintained between 25° C. and 35° C. with an ice water bath. After completion of Charge III, the reaction mixture was held at between 25° C. and 35° C. for 30 minutes. Epoxy equivalent weight was then measured to determine completion of the reaction. A vacuum was applied and MIBK distilled off at a temperature ranging from 80° C. to 130° C.

The finished product was 100 weight percent solids, with an acid number of 164.41, and a number average molecular weight of 455, determined by GPC using a THF standard.

SYNTHESIS EXAMPLE 3 (Comparative)

A reaction product of phosphorous acid, a monoepoxide, and an anhydride was prepared from the following ingredients:

| INGREDIENTS | AMOUNTS |
| --- | --- |
| Charge I | |
| Phosphorous Acid | 508.7 |
| Charge II | |
| Phenyl Glycidyl Ether | 1863.4 |
| Charge III | |
| Hexahydrophthalic Anhydride | 1434.7 |

Charge I was added to a suitable reactor under a nitrogen blanket and heated to 70° C. Vacuum was applied to remove traces of moisture over 30 minutes. Charge II was added over 30 minutes while maintaining 70° C. reaction temperature. The reaction was held at this temperature until the epoxy equivalent weight was greater than 10,000. Charge III was added over a one hour period maintaining 70° C. reaction temperature. The reaction temperature was raised to 90° C. after the addition of Charge III was complete. The reaction was held at this temperature until no anhydride could be detected by IR. The product had a solids content of 97.06% and an acid value of 197.8.

SYNTHESIS EXAMPLE 4

A reaction product of phosphorous acid, a monoepoxide, and an anhydride, chainextended with a diepoxide was prepared from the following ingredients:

| INGREDIENTS | AMOUNTS |
| --- | --- |
| Charge I | |
| Synthesis Example 3 | 293.7 |
| Dimethyl Cocoamine | 2.5 |
| Charge II | |
| Eponex 1511[1] | 315.0 |

[1]polyepoxide commercially available from Resolution Performance Products.

Charge I was added to a suitable flask and allowed to melt at 100° C. When completely melted, Charge II was added over 15 minutes allowing an exotherm to occur at which the temperature rose to 145° C. After the exotherm, the temperature was reduced to 122° C. and allowed to hold until achieving an acid value of 30.87. The solids of the product was 99.2%.

SYNTHESIS EXAMPLE 5

A reaction product of phosphorous acid, a diepoxide, and an anhydride, chain-extended with a diol was prepared from the following ingredients:

| INGREDIENTS | AMOUNTS |
| --- | --- |
| Charge I | |
| Synthesis Example 2 | 663.9 |
| 1,6 Hexanediol | 118.0 |
| Dibutyl Tin Oxide | 1.56 |

The above ingredients were added to a suitable reactor and heated to 120° C. and held for one hour. After the initial hold, the reaction temperature was increased to 140° C. and held an additional one hour. At this temperature, water began to distill. After this hold period the temperature was raised to 160° C. and held another hour. At this point, 17 cc of water was removed. The temperature was raised to 190° C. and held another hour. After this hold, the temperature was again raised to 200° C. and held until a total of 32.4 g of water had been removed. The batch was then cooled and discharged from the reactor.

Powder Coating Compositions Coating Examples 1 through 8

Each epoxy-acid powder clearcoat composition in Coating Examples 1 through 8 in Table 1 below is shown in parts by weight. Each composition was processed in the following manner. The components were blended in a Henschel Mixer for 60 to 90 seconds. The mixtures were then extruded through a Werner & Pfleider co-rotating twin screw extruder operating at a screw speed of 450 RPM with barrel temperatures adjusted to produce extrudate at a temperature of 100° C. to 125° C. The extruded material was then ground to a mean particle size of 17 to 27 microns using an ACM 2 (Air Classifying Mill from Hosakowa Micron Powder Systems). The finished powders were electrostatically sprayed onto test panels and evaluated for thermal oxidation of the coating system by color measurement of yellowness.

TABLE 1

| Component | Example 1 Comparative | Example 2 | Example 3 | Example 4 | Example 5 | Example 6 Comparative | Example 7 Comparative |
|---|---|---|---|---|---|---|---|
| [1]GMA Acrylic | 70.56 | 69.26 | 68.70 | 67.43 | 70.56 | 69.05 | 69.05 |
| Dodecanedioic acid | 23.17 | 22.75 | 22.56 | 22.15 | 23.17 | 22.68 | 22.68 |
| [2]Acrylic Flow Additive | 1.1 | 1.1 | 1.1 | 1.1 | 1.1 | 1.1 | 1.1 |
| Benzoin | 0.2 | 0.2 | 0.2 | 0.2 | 0.2 | 0.2 | 0.2 |
| [3]Wax C Micropowder | 0.6 | 0.6 | 0.6 | 0.6 | 0.6 | 0.6 | 0.6 |
| [4]Tinuvin 144 | 2 | 2 | 2 | 2 | 2 | 2 | 2 |
| [5]CGL 1545 | 2 | 2 | 2 | 2 | 2 | 2 | 2 |
| Synthesis Example 1 | | 1.72 | | | | | |
| Syntnesis Example 2 | | | 2.47 | | | | |
| Synthesis Example 4 | | | | 4.15 | | | |
| Synthesis Example 5 | | | | | 1.72 | | |
| Comparative Example 3 | | | | | | 2 | |
| [6]HCA-1 | | | | | | | 2 |
| [7]Armeen M2C | 0.37 | 0.37 | 0.37 | 0.37 | 0.37 | 0.37 | 0.37 |

[1]U.S. Pat. No. 6,277,917
[2]U.S. Pat. No. 6,013,733
[3]Wax C Micropowder, a fatty acid amide (ethylene bis-stearolyamide), commercially available from Hoechst-Celanese.
[4]2-tert-butyl-2-(4-hydroxy-3,5-di-tert-butylbenzyl)[bis(methyl-2,2,6,6,-tetramethyl-4-piperidinyl)] dipropionate), an ultraviolet light stabilizer commercially available from Ciba-Geigy Corp.
[5]2-[4((2-Hydroxy-3-(2-ethylhexyloxy)propyl)-oxy]-2-hydroxyphenyl)-4,6-bix(2,4-dimethylphenyl)-1,3, 5-triazine), an ultraviolet light stabilizer commercially available form Ciba-Geigy Corp.
[6]HCA-1, an anti-yellowing agent commercially availabie from Sanko Chemical Corp.
[7]Methyl dicocoamine commercially available from Akzo-Nobel Corp.

The Powder Coating Compositions of Coating Examples 1 to 7 were prepared for testing in the following manner. The test panels, pre-coated with an electrocoat primer commercially available from PPG Industries, Inc. as ED5000 were coated with a white solventborne primer/surfacer commercially available from Akzo-Nobel Corporation by spray application to a film thickness of approximately 1.1 mils (27.5 microns) and cured for 25 minutes at 311° F. (155° C.). The panels were then coated with a waterborne white base coat commercially available from BASF Corporation by spray application to a film thickness of 0.9 to 0.99 mils (23–25.2 microns). The base coat panels were flashed 10 minutes at 176° F. (80° C.) before electrostatically applying the powder clearcoat compositions of Examples 5 to 11. The powder coatings were applied at 1.97–2.36 mils (50–60 microns) film thickness and cured for 30 minutes at 293° F. (145° C). On each panel, a spot was located having a film thickness of 1.97–2.17 mils (50–55 microns) and marked on the reverse side of the panel. Color measurements were then made at this location on the panel using a MacBeth Color-Eye 3000 after calibration with a MacBeth white standard reference tile. Test conditions were run with a 10° Observer using CIELAB calculations and the B values (indicating yellowness) for the C illuminant were recorded. The same panels were then given a second 30 minute bake at 293° F. (145° C.), referred to as a 2x Overbake, and color measurements were again made. The same panels were then baked for an additional 90 minutes at 293° F. (145° C.), referred to as a 5x Overbake, and color measurements were again made. Table 2 summarizes the yellowing results comparing the B values to Coating Example 1, the comparative sample with no antioxidant. A "+" rating indicates an improvement in B units in yellowing over the comparative sample of 0.2 to 0.59. A "++" indicates an improvement of 0.6 to 0.99 and a "+++" indicates an improvement of >1.

TABLE 2

| | Coating Example 2 | Coating Example 3 | Coating Example 4 | Coating Example 5 | Coating Example 6 Comparative | Coating Example 7 Comparative |
|---|---|---|---|---|---|---|
| B Value Normal Bake | + | ++ | ++ | + | ++ | +++ |
| B Value 2x Overbake | + | ++ | ++ | + | ++ | +++ |
| B Value 5x Overbake | + | ++ | ++ | + | +++ | +++ |

The data presented above in Table 2 illustrate that the powder clearcoat compositions of the present invention (Coating Examples 2–5) provide improved yellowing/oxidation resistance over that of the Coating Example 1, the comparative example which contains no antioxidant.

Liquid Coating Compositions Resin Example 1

A carbamate functional acrylic was prepared from the following ingredients:

| Ingredient | Weight in parts |
|---|---|
| Acrylic polymer[1] | 1614.4 |

-continued

| Ingredient | Weight in parts |
|---|---|
| Methyl carbamate | 240.3 |
| Butyl stannoic acid | 3.05 |
| Triphenyl phosphite | 3.05 |

[1] Made from hydroxypropyl acrylate, butyl methacrylate and alpha-methyl styrene dimer (90% solids in DOWANOL PM, which is propylene glycol methyl ether, available from Dow Chemical Co.).

A suitable reactor equipped with a thermocouple, overhead stirrer, nitrogen inlet and a reflux condenser was charged with the above ingredients. The reaction mixture was heated to 145° C. under a nitrogen blanket. At this temperature, reflux was observed. The reaction mixture was held at reflux for one hour. After the hold period was complete, the reflux condenser was removed, and the reactor equipped for distillation (short column, still head, thermocouple, and receiver) at atmospheric pressure. Distillate began to come over at 139° C. The temperature of the reaction was gradually raised to 151° C. to maintain a steady rate of distillation. At this point, 87 parts of distillate had been collected. The reaction mixture was then cooled to 140° C. and equipped for simple vacuum distillation (still head, vacuum adapter, receiver flask). Distillation was resumed under reduced pressure; the pressure inside the reactor was gradually reduced to maintain distillation until a reactor pressure of 60-mm Hg was attained. When the distillation was essentially stopped, the reaction mixture was sampled and the hydroxyl value found to be 36. The additional distillate collected totaled 158 parts. The contents of the reactor were then diluted with 410 parts of ethyl 3-ethoxypropionate and 410 parts DOWANOL PM. The final resin solution was found to have solids content of 64.5%, determined at 110° C. for one hour. The weight average molecular weight was about 10,400 and the number average molecular weight was about 2,900, as determined by gel permeation chromatography using a polystyrene standard.

Resin Example 2

A carbamate-functional polyester was prepared from the following ingredients:

| Ingredient | Weight in parts |
|---|---|
| Polyester[1] | 6916.4 |
| Methyl carbamate | 1081.4 |
| Butyl stannoic acid | 14.4 |
| Triphenyl phosphite | 14.4 |
| DOWANOL PM | 1297.7 |

[1] made from 2,2,4-trimethyl-1,3-pentanediol/trimethylol propane/neopentyl glycol/hexahydrophthalic anhydride in a 22.7:10.6:17.5:49.2 weight ratio, 100% solids.

A suitable reactor was charged with the above ingredients and equipped with a thermocouple, overhead stirrer, nitrogen inlet and a reflux condenser. The mixture was heated to 141° C. under a nitrogen blanket. At this temperature, reflux was observed. The reaction mixture was held at reflux for one hour. After the hold period was complete, the reflux condenser was removed and the reactor equipped for distillation (short column, still head, thermocouple, and receiver) at atmospheric pressure. Distillate began to come over at 132° C. The temperature of the reaction was gradually raised to 151° C. to maintain a steady rate of distillation. At this point 422 parts of distillate had been collected. The reaction mixture was then cooled to 145° C. and equipped for simple vacuum distillation (still head, vacuum adapter, receiver flask). Distillation was resumed under reduced pressure; the pressure inside the reactor was gradually reduced to maintain distillation until a reactor pressure of 60-mm Hg was attained. When the distillation was essentially stopped, the reaction mixture was sampled and the hydroxyl value found to be acceptable (32.6). The additional distillate collected totaled 1007 parts. The contents of the reactor were cooled and then diluted with 1295 parts of DOWANOL PM and 1648 parts of DOWANOL PM Acetate. The final resin solution was found to have a solids content of 69.5%, determined at 110° C. for one hour, a weight average molecular weight of about 2,500 and a number average molecular weight of about 1,200, as determined by gel permeation chromatography using a polystyrene standard.

Resin Example 3

A reaction product of phosphorous acid and a diepoxide similar to that of SYNTHESIS EXAMPLE 1 above was prepared from the following ingredients:

| INGREDIENTS | AMOUNTS |
|---|---|
| Charge I | |
| Phosphorous acid | 98.4 |
| Charge II | |
| MIBK | 150.0 |
| Charge III | |
| EPONEX 1510 | 441.0 |
| MIBK | 100.0 |

Charge I was added to a suitable reactor and heated under agitation and vacuum for 30 minutes to 90° C. to remove traces of water. Charge II was added and the mixture stirred to dissolve the phosphorous acid. Upon complete dissolution, the mixture was cooled to 35° C. Charge III was added over 180 minutes and the temperature maintained between 25° C. and 35° C. with an ice water bath. After completion of Charge ll, the reaction mixture was held at 80° C. for-60 minutes. Epoxy equivalent weight was then measured to determine completion of the reaction. A vacuum was applied and MIBK distilled off at a temperature ranging from 80° C. to 120° C.

The finished product was 70.59 weight percent solids, with an acid number of 127.31, and a number average molecular weight of 1723, determined by GPC using a THF standard.

Coating Example 8

Comparative Sample with No Antioxidant

A clear film-forming composition was prepared by mixing together, in order, the following ingredients:

| Ingredient | Solid Wt. (g) | Solution Wt. (g) |
|---|---|---|
| Xylene | | 5.96 |
| Ethylene glycol monohexyl ether | | 5.55 |
| Methyl Amyl Ketone | | 12.0 |

-continued

| Ingredient | Solid Wt. (g) | Solution Wt. (g) |
| --- | --- | --- |
| Chisorb 328[1] | 1.30 | 1.30 |
| Tinuvin 900[2] | 1.30 | 1.30 |
| Acrylic Microgel Dispersion[3] | 1.80 | 6.00 |
| Silica Dispersion[4] | 5.03 | 12.6 |
| RESIMENE 757[5] | 39.5 | 40.7 |
| Ethanol | | 4.61 |
| Carbamate functional Polyester (Liquid Resin Example 2) | 41.0 | 57.0 |
| Carbamate Functional Acrylic (Liquid Resin Example 1) | 13.7 | 21.7 |
| Tinuvin 292[6] | 0.34 | 0.34 |
| Dislon OX-60[7] | 0.06 | 0.12 |
| RK-5345[8] | 0.39 | 0.65 |
| DDBSA[9] | 1.00 | 1.43 |

[1]Substituted benzotriazole UV Light stabilizer available from Chitech Chemical Company.
[2]Substituted benzotriazole UV Light stabilizer available from Ciba Geigy Corporation.
[3]A non-aqueous dispersion of an acrylic polymer formed from ethylene glycol dimethacrylate, styrene, butyl acrylate and methyl methacrylate at 30% solids in oxohexyl acetate.
[4]Fumed silica grind.
[5]A fully alkylated methoxy/butoxy functional aminoplast available from Solutia, Inc.
[6]Sterically hindered-amine-light-stabilizer available from Ciba-Geigy Corporation.
[7]Additive available from King Industries.
[8]Additive available from E. I. DuPont de Nemours and Co.
[9]Dodecyl benzene sulfonic acid solution.

Coating Example 9

A clear film-forming composition was prepared by mixing together the following ingredients:

| Ingredient | Solid Wt. (g) | Solution Wt. (g) |
| --- | --- | --- |
| Clear film-forming Composition from Coating Example 5 | 105.34 | 171.26 |
| Liquid Resin Example 3 | 0.5 | .74 |

Coating Example 10

A clear film-forming composition was prepared by mixing together the following ingredients:

| Ingredient | Solid Wt. (g) | Solution Wt. (g) |
| --- | --- | --- |
| Clear film-forming Composition from Coating Example 8 | 105.34 | 171.26 |
| Liquid Resin Example 3 | 1.0 | 1.47 |

Coating Example 11

A clear film-forming composition was prepared by mixing together the following ingredients:

| Ingredient | Solid Wt. (g) | Solution Wt. (g) |
| --- | --- | --- |
| Clear film-forming Composition from Coating Example 8 | 105.34 | 171.26 |
| Liquid Resin Example 3 | 2.0 | 2.94 |

Experimental Details

The film-forming compositions of Liquid Coating Examples 8–11 were applied to pigmented base coats to form color-plus-clear composite coatings over a steel substrate with electrocoat primer and primer surfacer. The base coat used for the examples is commercially available from PPG Industries, Inc. and is identified as NHU-90394 (White). The primer used is commercially available from PPG Industries, Inc. and is identified as FCP-6579. The electrocoat used on the steel is commercially available from PPG Industries, Inc. and is identified as ED5000.

The base coat was spray applied in two coats to the primed electrocoated steel panels at a temperature of about 75° F. (24° C.). Approximately a 60 second flash time was allowed between the base coat applications. After the second base coat application, a 90 second flash time was allowed at about 75° F. (24° C.). The composite coating was allowed to air flash at about 75° F. (24° C.) for 8–10 minutes before baking at 285° F. (141° C.) to fully cure the base coat. The clear coating compositions of Examples 9–12 were each applied to a fully baked base coated panel in two coats with a 60 second flash at 75° F. (24° C.) allowed between coats. The composite coating was allowed to air flash at about 75° F. (24° C.) for 8–10 minutes before baking at 285° F. (141° C.) to cure the clearcoat. The panels were baked in a horizontal position. The colored panel for each clearcoat example was baked for 30 minutes. Following the initial bake, the panel was cut in half. One half of the panel was placed in a 310° F. (154° C.) oven for an additional 45 minutes.

In order to test for yellowing, the X-Rite (multi-angle) spectrophotometer was used to take the measurements. The standard white calibration tile was used as the reference source. When the-standard-white calibration tile is used, *b values are recorded.

The b color scale ranges from − to +b values, where a negative value indicates a shift to the blue (less yellowing) and positive value indicates a shift to the yellow (more yellowing). The X-Rite yellowing results over the white base coat comparing the B values for Coating Examples 9–11 to Coating Example 8, the comparative sample with no antioxidant are summarized in Table 3, below. A "+" rating indicates an improvement in B units in yellowing over the comparative sample of 0.2 to 0.59. A "++" indicates an improvement of 0.6 to 0.99 and a "+++" indicates an improvement of >1.

TABLE 3

| Clearcoat | CC Description | 30 min @ 285° F. | Additional bake 45 min @ 310° F. |
|---|---|---|---|
| Coating Example 9 | 0.5% Sythesis Example 1 | + | + |
| Coating Example 10 | 1% Synthesis Example 1 | + | + |
| Coating Example 11 | 2% Synthesis Example 1 | + | + |

Table 3 shows that in the presence of the anti-oxidant (Coating Example 9, 10, and 11), a less yellow film is obtained as noted by comparison to Coating Example 8, which does not contain the additive.

Those skilled in the art will recognize that changes may be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

We claim:

1. A curable film-forming composition comprising (i) 5 to 95 percent by weight based on the total weight of resin solids in the film-forming composition of a crosslinking agent; (ii) 5 to 95 percent by weight based on the total weight of resin solids in the film-forming composition of a polymer containing a plurality of functional groups reactive with the crosslinking agent; and (iii) 0.01 to 15 percent by weight based on the total weight of resin solids in the film-forming composition of at least one additive selected from the group consisting of:
   (a) a reaction product of phosphorous acid and at least one diepoxide wherein the molar ratio of phosphorous acid to diepoxide ranges from 1.06:1.05 to 1.2:1.05;
   (b) a reaction product of phosphorous acid, at least one diepoxide, and at least one anhydride;
   (c) a reaction product of phosphorous acid, at least one diepoxide, and at least one anhydride, chain extended with at least one diol;
   (d) a reaction product of phosphorous acid, at least one monoepoxide, and at least one anhydride, chain extended with at least one diepoxide; and
   (e) mixtures thereof.

2. The film-forming composition of claim 1, wherein the polymer is present in the film-forming composition in amounts of 20 to 80 percent by weight based on the total weight of resin solids in the film-forming composition.

3. The film-forming composition of claim 1, wherein the crosslinking agent is present in the film-forming composition in amounts of 20 to 80 percent by weight based on the total weight of resin solids in the film-forming composition.

4. The film-forming composition of claim 1, wherein the additive is present in the film-forming composition in amounts of 0.5 to 5 percent by weight based on the total weight of resin solids in the film-forming composition.

5. The film-forming composition of claim 1, wherein the additive is a reaction product of phosphorous acid and at least one diepoxide.

6. The film-forming composition of claim 5, wherein the diepoxide is an aliphatic diepoxide.

7. The film-forming composition of claim 1, wherein the additive is a reaction product of phosphorous acid, at least one diepoxide, and at least one anhydride.

8. The film-forming composition of claim 7, wherein the diepoxide is an aliphatic diepoxide.

9. The film-forming composition of claim 7, wherein the anhydride is a cyclic anhydride.

10. The film-forming composition of claim 1, wherein the additive is a reaction product of phosphorous acid, at least one diepoxide and at least one anhydride, chain extended with at least one diol.

11. The film-forming composition of claim 10, wherein the diepoxide is an aliphatic diepoxide.

12. The film-forming composition of claim 10, wherein the anhydride is a cyclic anhydride.

13. The film-forming composition of claim 10, wherein the diol is selected from hexanediol, diethylene glycol, polypropylene glycols, neopentyl glycol, and mixtures thereof.

14. The film-forming composition of claim 1, wherein the number average molecular weight of the additive is in the range of 300 to 10000, as determined by gel permeation chromatography using a polystyrene standard.

15. The film-forming composition of claim 1, wherein the crosslinking agent comprises a polycarboxylic acid and the polymer comprises a polyepoxide.

16. The film-forming composition of claim 1, wherein the composition is in a solid particulate form.

17. A multi-component composite coating comprising a pigmented film-forming composition serving as a base coat and a clear film-forming composition serving as a transparent topcoat over the base coat wherein the transparent topcoat is a curable film-forming composition comprising (i) 5 to 95 percent by weight based on the total weight of resin solids in the clear film-forming composition of a crosslinking agent; (ii) 5 to 95 percent by weight based on the total weight of resin solids in the clear film-forming composition of a polymer containing a plurality of functional groups reactive with the crosslinking agent; and (iii) 0.01 to 15 percent by weight based on the total weight of resin solids in the clear film-forming composition of at least one additive selected from the group consisting of:
   (a) a reaction product of phosphorous acid and at least one diepoxide;
   (b) a reaction product of phosphorous acid, at least one diepoxide, and at least one anhydride;
   (c) a reaction product of phosphorous acid, at least one diepoxide, and at least one anhydride, chain extended with at least one diol;
   (d) a reaction product of phosphorous acid, at least one monoepoxide, and at least one anhydride, chain extended with at least one diepoxide; and
   (e) mixtures thereof.

18. The multi-component composite coating of claim 17, wherein the polymer is present in the clear film-forming composition in amounts of 20 to 80 percent by weight based on the total weight of resin solids in the clear film-forming composition.

19. The multi-component composite coating of claim 17, wherein the crosslinking agent is present in the clear film-forming composition in amounts of 20 to 80 percent by weight based on the total weight of resin solids in the clear film-forming composition.

20. The multi-component composite coating of claim 17, wherein the additive is present in the clear film-forming composition in amounts of 0.5 to 5 percent by weight based on the total weight of resin solids in the clear film-forming composition.

21. The multi-component composite coating of claim 17, wherein the additive is a reaction product of phosphorous acid and at least one diepoxide.

22. The multi-component composite coating of claim 21, wherein the diepoxide is an aliphatic diepoxide.

23. The multi-component composite coating of claim 17, wherein the additive is a reaction product of phosphorous acid, at least one diepoxide, and at least one anhydride.

24. The multi-component composite coating of claim 23, wherein the diepoxide is an aliphatic diepoxide.

25. The multi-component composite coating of claim 23, wherein the anhydride is a cyclic anhydride.

26. The multi-component composite coating of claim 17, wherein the additive is a reaction product of phosphorous acid, at least one diepoxide, and at least one anhydride, chain extended with at least one diol.

27. The multi-component composite coating of claim 26, wherein the diepoxide is an aliphatic diepoxide.

28. The multi-component composite coating of claim 26, wherein the anhydride is a cyclic anhydride.

29. The multi-component composite coating of claim 26, wherein the diol is a selected from hexanediol, diethylene glycol, polypropylene glycols, neopentyl glycol, and mixtures thereof.

30. The multi-component composite coating of claim 17, wherein the number average molecular weight of the additive in the clear film-forming composition is in the range of 300 to 10000, as determined by gel permeation chromatography using a polystyrene standard.

31. The multi-component composite coating of claim 17, wherein the crosslinking agent comprises a polycarboxylic acid and the polymer comprises a polyepoxide.

32. The multi-component composite coating of claim 17, wherein the clear film-forming composition is in a solid particulate form.

* * * * *